United States Patent

Siddall

[15] 3,697,565
[45] Oct. 10, 1972

[54] TETRAALKYL SUBSTITUTED UNSATURATED ACIDS AND ESTERS HAVING A TERMINAL QUATERNARY ALKYL GROUP USEFUL FOR INSECT CONTROL

[72] Inventor: John B. Siddall, Palo Alto, Calif.

[73] Assignee: Zoecon Corporation, Palo Alto, Calif.

[22] Filed: Feb. 2, 1970

[21] Appl. No.: 7,987

[52] U.S. Cl............260/408, 260/340.9, 260/348 A, 260/405, 260/410, 260/410.5, 260/413, 260/410.9 R, 260/438.1, 260/484 R, 260/484 A, 260/486 R, 260/593 R, 260/652 R, 260/665 R, 260/638 A, 260/483, 204/158 R, 204/161, 424/312, 424/318

[51] Int. Cl.......C07c 57/02, C07c 69/52, A01n 9/24

[58] Field of Search.260/410.9, 413, 408, 410, 410.5

[56] References Cited

UNITED STATES PATENTS 3,429,970  2/1969  Ruegg et al.................424/333

OTHER PUBLICATIONS

Chemical Abstracts 69 42045y (1968)

*Primary Examiner*—Lewis Gotts
*Assistant Examiner*—Diana G. Rivers
*Attorney*—Donald W. Erickson

[57] ABSTRACT

Aliphatic esters having terminal quaternary alkyl group and di-unsaturation in the backbone prepared by alkylation of allylic acetate useful for insect control.

15 Claims, No Drawings

TETRAALKYL SUBSTITUTED UNSATURATED ACIDS AND ESTERS HAVING A TERMINAL QUATERNARY ALKYL GROUP USEFUL FOR INSECT CONTROL

This invention relates to methods and compositions for the control of insects and to novel quaternary alkylated aliphatic esters and derivatives thereof of the following formula A:

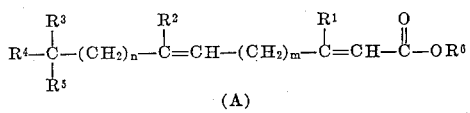

(A)

wherein, $m$ is an integer of 1 to 4;
$n$ is an integer of 1 to 4;
each of $R^1$, $R^2$, $R^3$, $R^4$ and $R^5$ is lower alkyl; and
$R^6$ is hydrogen, lower alkyl, cycloalkyl, aralkyl or a metal cation.

The term "lower alkyl", as used herein, refers to an alkyl group, straight or branched chain, having a chain length of one to six carbon atoms, such as methyl, ethyl, i-propyl, t-butyl, amyl, and the like. The term "cycloalkyl", as used herein, refers to a cycloalkyl group of four to eight carbon atoms, such as cyclopentyl and cyclohexyl. The term "aralkyl", as used herein, refers to an aralkyl group of seven to 12 carbon atoms, such as benzyl, phenylethyl, methylbenzyl and naphthylmethyl.

The term "metal cation", as used herein, refers to lithium, sodium, potassium, calcium, strontium, copper, manganese and zinc.

The present invention provides a novel method for the control of insects which comprises treating the insects with an effective amount of a compound of formula A. To aid in achieving the uniform and economical application, it is advantageous to employ a composition comprising an inert carrier and a compound of formula A. These compositions can be either liquid or solid. The exact formulation employed will vary according to factors, such as the specie of insect to be treated, the stage of the insect's life at time of treatment, the degree or extent of insect infestation, environmental conditions and type of application. The most advantageous formulation (composition) for the control of a specific insect is determinable by those of ordinary skill in the art by routine experimentation giving due consideration to the foregoing factors and the description herein.

The formulation employed is also dependent upon the primary role or mechanism of treating the insects — that is, topical application (absorption), per oral application (ingestion), chemosterilant (sterility) or vaporization (inhalation). The primary role of treating insects is, in turn, dependent on whether the insect is a chewing insect, a sucking insect or flying insect; whether the control of the insect is sought at the embryo, larvae, pupae or adult stage; and the locus of the insect.

Formulations can be prepared by incorporating a compound of formula A with a solid inert carrier, such as finely divided talc, silica, pyrophyllite or clay or granular inert carriers, such as the vermiculites or a liquid inert carrier, such as acetone, xylene, peanut oil, cottonseed oil, sesame oil and other vegetable and mineral oils conventionally employed as carriers in formulations for insect control. Other components can be included, such at emulsifying agents, wetting agents and dispersing agents. Generally, the formulation will contain less than 95 percent by weight of the compound and more frequently less than 25 percent. Depending upon the particular insect being treated and the particular stage of the life cycle at the time of treatment, control of insects by treating the insects with a compound of formula A is accomplished by the compound's ability to: inhibit metamorphosis; act as a direct insecticide, particularly at the embryo stage; act as a chemosterilant; or break the diapause of the insect.

Treatment of insects by vapor action can be accomplished, for example, by formulating a compound of formula A with a resinous material, such as the vinyl polymers, e.g. polyvinyl chloride. This method is particularly useful for flying insects and treating enclosed areas. Suitable formulating methods and carriers are described in U.S. Pat. No. 3,318,769, for example.

Although not intending to be limited by a theoretical explanation, it appears that the effectiveness of the compounds of formula A can be traced to their ability to mimic the activity of juvenile hormone substances. Juvenile hormone was identified as methyl 10,11-oxido-7-ethyl-3,11-trimethyltrideca-2,6-dienoate using an extract of Cecropia moths by Roeller et al., Angew. Chem. internat. Edit. 6, 179 (1967) and Chemical & Engineering New, 48–49 (April 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth", Zoology (Proc. N.A.S.) 60, 853 (1968). In addition to the natural juvenile hormones, some synthetic terpenoids have been reported exhibiting maturation inhibiting, sterility or ovicidal activity. Bowers et al., Life Sciences (Oxford) 4, 2323 (1965); BioScience 18, No. 8, 791 (Aug., 1968); Williams, Scientific American 217, No. 1, 13 (July, 1967); Science 154, 248 (Oct. 14, 1966); Romanuk et al., Proc. Nat. Acad. Sci. 57, 349 (1967); Masner et al., Nature 219, 395 (July 27, 1968); U.S. Pat. Nos. 3,429,970 and 3,453,362; and Bowers, "Juvenile Hormone: Activity of Aromatic Terpenoid Ethers", Science 164, 323 (Apr., 1969).

In the application of the compounds of formula A, it is more economical and expedient to use a mixture of isomers to avoid separation processing. As individual isomers, the trans trans isomer is preferably employed for the control of insects.

Typical insects which can be controlled by treatment with a compound of formula A in accordance with the present invention are Dysdercus cingluatus, Tenebrio molitor, Galleria mellonella, Tribolium confusm, Periplaneta americana Hypera puctata (clover leaf weevil), Dysdercus suturellus, Aphididae, such as melon aphid and cabbage aphid, Tinea pellionella, Sitophilus granarius, Lygus hesperus and Schistocerca vaga.

In the description hereinafter, each of $R^1$, $R^2$, $R^3$, $R^4$, $R^5$, $R^6$, m and n are as defined hereinabove.

The compounds of formula A, wherein $R^6$ is alkyl, are prepared according to the following outlined procedure.

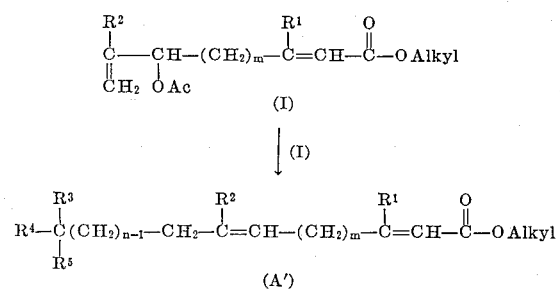

In the practice of the above process, an allylic ester of formula I, such as the allylic acetate (Ac = acetyl), allylic propionate or allylic benzoate, is alkylated using an organo-copper reagent of formula II or a mixed organo-copper reagent to yield the quaternary alkyl ester of formula A'. The reaction is conducted in an organic solvent inert to the reaction, such as ether or hydrocarbon, e.g. pentane, toluene, ether, tetrahydrofuran, monoglyme, diglyme or dioxane at a temperature of the order of room temperature to about −100°C, generally from about 0°C to −80° C, and is complete within a few minutes to a few hours.

The organo-copper reagent (II) is prepared by the reaction of cuprous salt, e.g. cuprous iodide, cuprous chloride, cuprous acetate, and the like, with an organolithium compound of formula III.

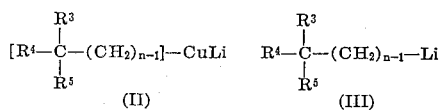

Formation of the organo-copper reagent is accomplished using the procedure of Siddall et al., J. Am. Chem. Soc. 91, 1853 (1969) or Whitesides et al., J. Am. Chem. Soc. 91, 4871 (1969). Generally, the organo-copper reagent is prepared and the allylic ester added to the organo-copper solution. Reagents of formula II may also be used in the presence of ligands to overcome insolubility problems of the reagent II. The organo-lithium compounds are prepared from the reaction of the corresponding halide and lithium in ether and/or hydrocarbon solvent. The halides are prepared from the corresponding alcohols (IV) by treatment with phosphorus trichloride or phosphorus tribromide which are fully described in my application Ser. No. 854,778, filed Sept. 2, 1969, now U.S. Pat. No. 3,649,590, the disclosure of which is hereby incorporated by reference.

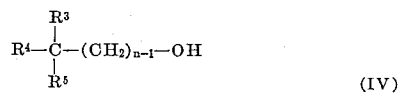

The alkyl esters (A') are converted into the free acid (A; $R^6$ is hydrogen) by hydrolysis with base in an organic solvent, such as methanol or ethanol. The alkyl ester (A') or the free acid thereof can be converted into other esters of formula A by conventional procedures, such as transesterification or formation of the acid halide (A'') followed by treatment with the alcohol corresponding to the ester moiety desired. X is bromo or chloro.

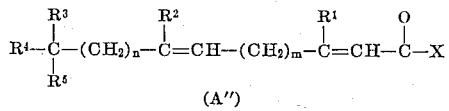

The allylic esters of formula I can be prepared from an epoxide of formula V by opening of the epoxide to the diol, cleavage of the diol to the terminal aldehyde, treatment of the aldehyde with Grignard to the allylic alcohol and esterification of the allylic alcohol to the allylic ester or by photooxygenation of a diene of formula VI to the allylic hydroperoxide followed by reduction thereof to the allylic alcohol and esterification of the allylic alcohol.

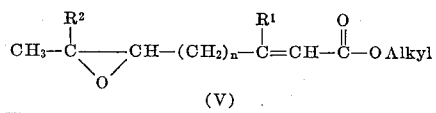

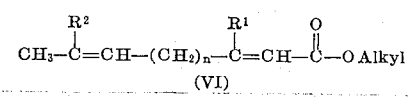

The alkyl esters of formulas V and VI are prepared according to the following outlined process.

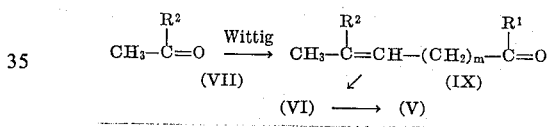

In the practice of the above process, a methyl ketone of formula VII, such as dimethylketone or methylethylketone, is reacted with a Wittig reagent of formula VIII ($\phi$ is phenyl):

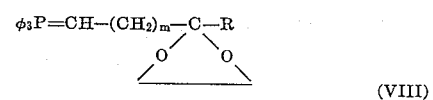

in an organic solvent, such as dimethylsulfoxide, or the like, to form the ethylene ketal of a compound of formula IX which is hydrolyzed by treatment with acid to the ketone (IX). The ketone (IX) is then reacted with the carbanion of dialkyl carbalkoxymethylphosphonate to yield the di-unsaturated ester (VI). The ester (VI) is epoxidzed using m-chloroperbenzoic acid or by treatment with N-halosuccinimide followed by base.

The compounds of formula A (with the exception of the salts) are also useful lubricants for plastic and metal surfaces and plasticizers for hydrocarbon polymers, such as SBR, ABS, polypropylene, natural rubber, and the like.

The following examples describe in detail procedures for the preparation of the compounds of the present invention and illustrate the synthesis thereof. Temperature in degrees Centigrade.

PREPARATION 1

A. To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml of benzene is added 20 g. of triphenylphosphine. The mixture is heated at reflux temperature for two hours and then filtered. The solid material thus-collected is washed with benzene, dried in vacuo and added to 6.49 g. of butyl lithium in 50 ml. of dimethylsulfoxide. The mixture is stirred until an orange solution is obtained and 3.8 g. of methylethylketone is then added. The mixture is stirred at about 25° for about eight hours, poured into water and then extracted with ether. The ethereal extracts are concentrated and the concentrate added to 0.1N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one which is purified by chromatography and separated into the cis and trans isomer.

The process of Part A is repeated with the exception of using an equivalent amount of the ethylene ketal of each of 1-bromo-4-hexanone, --bromo-3-butanone, 1-bromo-5-hexanone and 1-bromo-6-heptanone in place of the ethylene ketal of 1-bromo-4-pentanone to yield 7-methylnon-6-en-3-one, 5-methyl-hept-4-en-2-one, 7-methylnon-6-en-2-one and 8-methyldec-7-en-2-one, respectively.

By use of the process of Part A, acetone is reacted with the phosphonium ylid prepared from the ethylene ketal of each of 1-bromo-4-pentanone, 1-bromo-4-hexanone, 1-bromo-3-butanone, 1-bromo-5-hexanone and 1-bromo-6-heptanone to yield 6-methylpent-5-en-2-one, 7-methyloct-6-en-3-one, 5-methylhex-4-en-2-one, 7-methyloct-6-en-2-one and 8-methylnon-7-en-2-one, respectively.

In the same manner, other methyl ketones of formula VII are reacted with other Wittig reagents of formula VIII to yield other mono-unsaturated ketones of formula IX.

B. A mixture of 11.2 g. of diethyl carbethoxymethylphosphonate in 100 ml. of dimethylformamide is treated with 2.4 g. of sodium hydride. The mixture is stirred until the evolution of gas ceases and then 10 g. of 6-methyloct-5-en-2-one is added slowly with stirring, maintaining a temperature below 30°. The mixture is stirred for about one hour, then diluted with water and then extracted with ether. The ethereal extracts are washed with water, dried over sodium sulfate and evaporated under reduced pressure to yield ethyl 3,7-dimethyl-nona-2,6-dienoate which is purified and separated into the individual isomers by chromatography.

By repeating the process of Part B using each of 6-methylhept-5-en-2-one, 8-methylnon-7-en-2-one, 7-methyloct-6-en-2-one, 5-methylhex-4-en-2-one, 7-methylnon-6-en-3-one, 7-methylnon-6-en-2-one, 5-methylhept-4-en-2-one and 8-methyldec-7-en-2-one as the starting material in place of 6-methyloct-5-en-2-one, there is obtained ethyl 3,7-dimethylocta-2,6-dienoate, ethyl 3,9-dimethyldeca-2,8-dienoate, ethyl 3,8-dimethylnona-2,7-dienoate, ethyl 3,6-dimethylhepta-2,5-dienoate, ethyl 3-ethyl-7-methylnona-2,6-dienoate, ethyl 3,8-dimethyldeca-2,7-dienoate, ethyl 3,6-dimethylocta-2,5-dienoate and ethyl 3,9-dimethylundeca-2,8-dienoate, respectively.

Repeating the foregoing process with the exception of using diethyl carbomethoxymethylphosphonate in place of diethyl carbethoxymethylphosphonate, the corresponding methyl esters are obtained, i.e. methyl 3,7-dimethylnona-2,6-dienoate, methyl 3,7-dimethylocta-2,6-dienoate, methyl 3,9-dimethyldeca-2,6-dienoate, methyl 3,8-dimethylnona-2,7-dienoate, methyl 3,6-dimethylhepta-2,5-dienoate, methyl 3-ethyl-7-methylnona-2,6-dienoate, methyl 3,8-dimethyldeca-2,7-dienoate, methyl 3,6-dimethylocta-2,5-dienoate and methyl 3,9-dimethylundeca-2,8-dienoate.

In the practice of the above process, a mixture of isomers from Part A can be used as the starting material or either of the individual isomers and upon completion of the reaction of Part B, the isomers can be separated by gas-liquid chromatography or used as a mixture of isomers in the next step. Preferably, the isomeric mixture resulting from Part B is separated prior to the next reaction, trans configuration at C—2,3 being preferred.

EXAMPLE 1

A. A mixture of 11 g. of ethyl 3,7-dimethylnona-2,6-dienoate, 100 mg. of hematoporphyrin and 100 ml. of dry pyridine in a pyrex vessel, into which is slowly and continuously bubbled oxygen, is irradiated by exposure to a 15 watt fluorescent lamp (about 2 inches from vessel) for about 40 hours. When starting material has disappeared as checked by thin layer chromatography, the reaction mixture, without isolation of the reaction product (ethyl 6-hydroperoxy-7-methylene-3-methylnon-2-enoate), is cooled to 5° and 7.5 g. of trimethylphosphite is added. The reaction is complete after about 3 hours to yield the allylic alcohol (ethyl 6-hydroxy-7-methylene-3-methylnon-2-enoate). Without isolation, there is added 3.2 ml. of acetic anhydride at room temperature. The mixture is stirred for about 2 hours, charcoal is added and then filtered. To the filtrate is added ice to destroy any excess acetic anhydride and then the solution poured into 450 ml. of ice cold 10 percent hydrochloric acid, which is then extracted with ether. The ether extracts are washed with water, saturated sodium chloride, saturated sodium bicarbonate and then brine, dried over sodium sulfate and evaporated to yield the allylic acetate (ethyl 6-acetoxy-7-methylene-3-methylnon-2-enoate) which can be purified by chromatography on silica.

B. By repeating the processes of Part A using each of ethyl 3,7-dimethylocta-2,6-dienoate, ethyl 3,9-dimethyldeca-2,8-dienoate, ethyl 3,8-dimethylnona-2,7-dienote, ethyl 3,6-dimethylhepta-2,5-dienoate, ethyl 3-ethyl-7-methylnona-2,6-dienoate, ethyl 3,8-dimethyldeca-2,7-dienoate, ethyl 3,6-dimethylocta-2,5-dienoate and ethyl 3,9-dimethylundeca-2,8-dienoate in place of ethyl 3,7-dimethylnona-2,6-dienoate as the starting material, there is obtained:
 ethyl 6-hydroperoxy-7-methylene-3-methyloct-2-enoate,
 ethyl 6-hydroxy-7-methylene-3-methyloct-2-enoate, and
 ethyl 6-acetoxy-7-methylene-3-methyloct-2-enoate;
 ethyl 8-hydroperoxy-9-methylene-3-methyldec-2-enoate, ethyl 8-hydroxy-9-methylene-3-methyldec-2-enoate, and
ethyl 8-acetoxy-9-methylene-3-methyldec-2-enoate;
ethyl 7-hydroperoxy-8-methylene-3-methylnon-2-enoate,
ethyl 7-hydroxy-8-methylene-3-methylnon-2-enoate, and
ethyl 7-acetoxy-8-methylene-3-methylnon-2-enoate;
ethyl 5-hydroperoxy-6-methylene-3-methylhept-2-enoate,
ethyl 5-hydroxy-6-methylene-3-methylhept-2-enoate, and
ethyl 5-acetoxy-6-methylene-3-methylhept-2-enoate;
ethyl 6-hydroperoxy-7-methylene-3-ethylnon-2-enoate,
ethyl 6-hydroxy-7-methylene-3-ethylnon-2-enoate, and
ethyl 6-acetoxy-7-methylene-3-ethylnon-2-enoate;
ethyl 7-hydroperoxy-8-methylene-3-methyldec-2-enoate,
ethyl 7-hydroxy-8-methylene-3-methyldec-2-enoate, and
ethyl 7-acetoxy-8-methylene-3-methyldec-2-enoate;
ethyl 5-hydroperoxy-6-methylene-3-methyloct-2-enoate,
ethyl 5-hydroxy-6-methylene-3-methyloct-2-enoate, and
ethyl 5-acetoxy-6-methylene-3-methyloct-2-enoate; and
ethyl 8-hydroperoxy-9-methylene-3-methylundec-2-enoate,
ethyl 8-hydroxy-9-methylene-3-methylundec-2-enoate, and
ethyl 8-acetoxy-9-methylene-3-methylundec-2-enoate, respectively.

In the same manner, repeating the process of Part A using other carboxylic anhydrides, such as propionic anhydride or benzoic anhydride in place of acetic anhydride, the corresponding allylic ester is obtained, e.g. ethyl 6-propionoxy-7-methylene-3-methylnon-2-enoate, ethyl 6-benzoyloxy-7-methylene-3-methylnon-2-enoate, ethyl 6-propionoxy-7-methylene-3-methyloct-2-enoate and ethyl 6-benzoyloxy-7-methylene-3-methyloct-2-enoate.

By use of the foregoing processes, each of the methyl esters of Preparation 1 is converted into the corresponding hydroperoxide, allylic alcohol and allylic ester.

C. To a mixture of 3.2 g. of cuprous iodide and 90 ml. of dry ether under nitrogen cooled to −10°, there is added 28.9 ml. (0.03 moles) of 3,3-dimethylbutyl lithium in ether.

After about 15 minutes, ethyl 6-acetoxy-7-methylene-3-methylnon-2-enoate (2.4 g) is added. The reaction is worked up after 30 minutes by pouring into saturated ammonium chloride, extracting with ether and washing the ethereal extracts with saturated ammonium chloride, 10% hydrochloric acid and saturated sodium chloride. The ether extracts are dried over magnesium sulfate and evaporated to yield ethyl 3,11,11-trimethyl-7-ethyldodeca-2,6-dienoate which can be purified by distillation.

3,3-Dimethylbutyl lithium is prepared from 1-chloro-3,3-dimethylbutane and lithium in ether in the presence of 1 percent sodium under argon.

D. By repeating the process of Part C of this example, using each of allylic acetates of Part B as the starting material in place of ethyl 6-acetoxy-7-methylene-3-methylnon-2-enoate, there is obtained:
ethyl 3,7,11,11-tetramethyldodeca-2,6-dienoate,
ethyl 3,9,13,13-tetramethyltetradeca-2,8-dienoate,
ethyl 3,8,12,12-tetramethyltrideca-2,7-dienoate,
ethyl 3,6,10,10-tetramethylundeca-2,5-dienoate,
ethyl 3,7-diethyl-11,11-dimethyldodeca-2,6-dienoate,
ethyl 3,12,12-trimethyl-8-ethyltrideca-2,7-dienoate,
ethyl 3,10,10-trimethyl-6-ethylundeca-2,5-dienoate, and
ethyl 3,13,13-trimethyl-9-ethyltetradeca-2,8-dienoate, respectively. In the same manner, the corresponding methyl dienoates are prepared.

(E) The same procedure of Part C of this Example is repeated with the exception of using 3,3-dimethylpentyl lithium in place of 3,3-dimethylbutyl lithium in the alkylation of the allylic acetates to yield:
ethyl 3,11,11-trimethyl-7-ethyltrideca-2,6-dienoate,
ethyl 3,7,11,11-tetramethyltrideca-2,6-dienoate,
ethyl 3,9,13,13-tetramethylpentadeca-2,8-dienoate,
ethyl 3,8,12,12-tetramethyltetradeca-2,7-dienoate,
ethyl 3,6,10,10-tetramethyldodeca-2,5-dienoate,
ethyl 3,7-diethyl-11,11-dimethyltrideca-2,6-dienoate,
ethyl 3,12,12-trimethyl-8-ethyltetradeca-2,7-dienoate,
ethyl 3,10,10-trimethyl-6-ethyldodeca-2,5-dienoate, and
ethyl 3,13,13-trimethyl-9-ethylpentadeca-2,8-dienoate, respectively.

EXAMPLE 2

A. To 108 mg. of cuprous iodide in 7 ml. of ether at −10° under argon is added 0.174 ml. of vinyl lithium (3.1M in ether). The suspension is stirred for about 0.5 hours at which time a negative Gilman test is obtained. Then 0.334 ml. of t-butyl lithium (1.62M in ether) is added and additional cuprous iodide added with stirring until a negative Gilman test is obtained. Then, one molar equivalent of ethyl 6-acetoxy-7-methylene-3-methyloct-2-enoate is added while maintaining the temperature at about −10°. After about one hour, the reaction is washed up by pouring into saturated ammonium chloride, followed by extraction with ether. The ether extracts are combined and washed with brine, dried over magnesium sulfate and evaporated under reduced pressure to yield ethyl 3,7,9,9-tetramethyldec-2,6-dienoate.

B. The process of Part A is repeated with the exception of using an equivalent amount of neopentyl lithium in place of t-butyl lithium to yield ethyl 3,7,10,10-tetramethyl-undeca-2,6-dienoate. By repeating this procedure using methyl 6-acetoxy-7-methylene-3-methylnon-2-enoate and methyl 6-acetoxy-7-methylene-3-methyloct-2-enoate to yield methyl 7-ethyl-3,10,10-tetramethylundeca-2,6-dienoate and methyl 3,7,10,10-tetramethyl-undeca-2,6-dienoate, respectively. Likewise, methyl 3,9,9-trimethyl-7-ethyldec-2,6-dienoate is obtained by using methyl 6-acetoxy-7-methylene-3-methyloct-2-enoate in the procedure of Part A.

EXAMPLE 3

To a solution of 2 g. of lithium di-t-butyl(tri-n-butylphosphine) cuprate in tetrahydrofuran at −78° under argon is added one molar equivalent of ethyl 6-acetoxy-7-methylene-3-methyloct-2-enoate while maintaining the temperature at about −78°. After about ten hours, the mixture is poured into saturated ammonium chloride and extracted with ether. The ether extracts are combined, washed with brine, dried over magnesium sulfate and evaporated to yield ethyl 3,7,9,9-tetramethyldec-2,6-dienoate.

Ethyl 3,6,8,8-tetramethylnona-2,5-dienoate is obtained from ethyl 5-acetoxy-6-methylene-3-methyl-hept-2-enoate using the foregoing process.

EXAMPLE 4

A mixture of 1 g. of methyl 3,11,11-trimethyl-7-ethyltrideca-2,6-dienoate, 60 ml. of methanol, 0.2 g. of sodium carbonate and 6 ml. of water is stirred at about 30° for three hours. The mixture is diluted with water, neutralized and then extracted with ether. The organic extracts are combined, washed with water, dried over sodium sulfate and evaporated at room temperature to yield 3,11,11-trimethyl-7-ethyltrideca-2,6-dienoic acid.

Similarly, 3,7,11,11-tetramethyltrideca-2,6-dienoic acid and 3,7,11,11-tetramethyldodeca-2,6-dienoic acid are prepared by hydrolysis of the corresponding ethyl or methyl ester of Example 1.

EXAMPLE 5

One gram of thionyl chloride is added with stirring at room temperature to 0.5 g. of 3,11,11-trimethyl-7-ethyltri-deca-2,6-dienoic acid and the mixture heated at about 50° for 10 minutes. Excess thionyl chloride is removed by evaporation to yield 3,11,11-trimethyl-7-ethyltrideca-2,6-dienoyl chloride to which there is added t-butyl alcohol (about 2 equivalents) and the mixture heated at about 50° for 5 minutes. Excess t-butyl alcohol is removed by evaporation to yield t-butyl 3,11,11-trimethyl-7e-ethyltrideca-2,6-dienoate.

Similarly, 3,7,11,11-tetramethyltrideca-2,6-dienoic acid and 3,7,11,11-tetramethyldodeca-2,6-dienoic acid is converted into 3,7,11,11-tetramethyltrideca-2,6-dienoyl chloride and t-butyl 3,7,11,11-tetramethyltrideca-2,6-dienoate and 3,7,11,11-tetramethyldodeca-2,6-dienoyl chloride and t-butyl 3,7,11,11-tetramethyldodeca-2,6-dienoate, respectively.

Similarly, by using other alcohols in place of t-butyl alcohol, such as cyclohexyl alcohol or benzyl alcohol, the corresponding esters are obtained, such as cyclohexyl 3,11,11-trimethyl-7-ethyltrideca-2,6-dienoate and benzyl 3,11,11-trimethyl-7-ethyltrideca-2,6-dienoate.

EXAMPLE 6

To a solution of 0.5 g. of 3,7,11,11-tetramethyl-dodeca-2,6-dienoic acid in 15 ml. of benzene is added with stirring one molar equivalent of potassium bicarbonate. The mixture is stirred until the evolution of carbon dioxide ceases and then evaporated to yield potassium 3,7,11,11-tetramethyldodeca-2,6-dienoate.

Alternatively, acid salts can be prepared by titrating the acid with an organic solution of the metal base, e.g. methanolic solution of sodium methoxide.

EXAMPLE 7

A solution of 2 g. of methyl 3,7,11,11-tetramethyl-dodeca-2,6-dienoate in 20 ml. of dry ether is added with stirring to 0.4 g. of lithium aluminum hydride covered in ether at 0°. After about one hour, 2.5 ml. of acetic acid is added. The mixture is washed with ice water and the ether phase dried and evaporated to yield 3,7,11,11-tetramethyldodeca-2,6-dien-1-ol.

Similarly, each of methyl 3,7,11,11-tetramethyl-trideca-2,6-dienoate and methyl 3,11,11-trimethyl-7-ethyltrideca-2,6-dienoate is reduced to 3,7,11,11-tetramethyltrideca-2,6-dien-1-ol and 3,11,11-trimethyl-7-ethyltrideca-2,6-dien-1-ol. The C—1 alcohols are useful for the control of insects in same manner as the compounds of formula A.

EXAMPLE 8

To each of a control of 20 Tribolium confusum pupae there is applied 1 μl. of acetone and to each of a second group of 20 Tribolium confusum pupae is applied 1 μl. of acetone containing 0.5 μg. of trans,trans methyl 3,7,11,11-tetramethyldodeca-2,6-dienoate. The control group specimens developed normally. The specimens of the second group failed to develop normally and died without reproducing.

EXAMPLE 9

A. Methyl 3,7-dimethylocta-2,6-dienoate (6 g.) in methylene dichloride (150 ml.) is cooled to 0° and then 7.35 g. of m-chloroperbenzoic acid is added. The mixture is stirred for 30 minutes and then washed with 10 percent sodium sulfite, 5 percent sodium bicarbonate and brine, dried over sodium sulfate and evaporated to yield methyl 6,7-oxido-3,7-dimethyloct-2-enoate which is purified by chromatography.

B. Methyl 6,7-oxido-3,7-dimethyloct-2-enoate (6.5 g.) is dissolved in 150 ml. of tetrahydrofuran. Water (150 ml.) is added, then 11 ml. of 3 percent perchloric acid is added to the solution (p H 2). 30 minutes after addition is complete, 52.5 g. of sodium chloride is added and the phases separated. The aqueous phase is extracted with ether and combined with the organic phase. The organic material is washed with saturated sodium carbonate and saturated sodium chloride until neutral, dried over sodium sulfate and evaporated to yield methyl 6,7-dihydroxy-3,7-dimethyloct-2-enoate which is purified by chromatography eluting with hexane/ethyl acetate.

C. The 6,7-diol (7.14 g.) of Part B is dissolved in 300 ml. of methanol and then 7.05 g. of sodium periodate in 60 ml. of water is added. Additional water (140 ml.) is added and the reaction mixture allowed to stand for about 16 hours at room temperature. The mixture is filtered and the filtrate concentrated by evaporation. The concentrate is poured into 200 ml. of water and extracted with ether. The ethereal extract is washed with saturated sodium chloride, dried over sodium sulfate and evaporated to yield the aldehyde (methyl 3-methyl-5-formylpent-2-enoate).

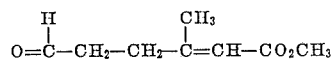

D. 2-Bromobut-1-ene (8.66 g.) is added to 1.08 g. of magnesium in 88 ml. of dry tetrahydrofuran over a period of 3 hours keeping the temperature at about 30°.

To a solution of 3.5 g. of the aldehyde of Part C in 44 ml. of dry tetrahydrofuran, cooled to −40°, is added 40 ml. of the Grignard reagent slowly over 45 minutes. An additional 32 ml. of the Grignard reagent is added. After two hours, the reaction is worked up by pouring into saturated ammonium chloride and extracting with ether. The ethereal extract is washed with brine, dried over sodium sulfate and evaporated to yield methyl 6-hydroxy-7-methylene-3-methylnon-2-enoate.

E. The allylic alcohol (3.9 g.) of Part D is dissolved in 30 mll of pyridine and then 17.4 ml. of acetic anhydride is added under nitrogen. After two hours, the mixture is poured into cold 10 % HCl and extracted with ether. The ethereal extract is washed with brine, saturated sodium bicarbonate and brine until neutral, dried over sodium sulfate and evaporated to yield methyl 6-acetoxy-7-methylene-3-methylnon-2-enoate which is purified by chromatography eluting with hexane/ethyl acetate.

By using isopropenyl bromide in Part D, there is obtained as the final product, methyl 6-acetoxy-7-methylene-3-methyloct-2-enoate.

By use of the process of this example, each of the alkyl dienoates of formula VI can be converted into the corresponding allylic ester of formula I.

In the processes described herein, there can be employed a mixture of the isomers of the starting material or a single isomer. In the case of compounds prepared for use on the control of insects, it is preferable to use a trans,trans isomer as the starting material. The isomers are separated by conventional techniques, such as gas-liquid chromatography or fractional distillation, either prior to the processes described herein or after completion of the reaction.

What is claimed is:

1. A compound selected from those of the following formula:

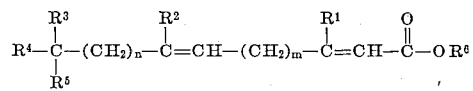

wherein,
  $m$ is an integer of 1 to 4;
  $n$ is an integer of 1 to 4;
  each of $R^1$, $R^2$, $R^3$, $R^4$ and $R^5$ is lower alkyl; and
  $R^6$ is hydrogen, alkyl, cycloalkyl, aralkyl or a metal cation.

2. A compound according to claim 1 wherein $m$ is the integer 2; $n$ is the integer 2 or 3; and each of $R^1$, $R^2$, $R^3$, $R^4$ and $R^5$ is methyl or ethyl.

3. A compound according to claim 2 wherein $R^1$ is methyl; $R^2$ is methyl or ethyl; $R^3$ is methyl; $R^4$ is methyl or ethyl; and $R^5$ is methyl.

4. A compound according to claim 2 wherein each of $R^1$, $R^2$, $R^3$, $R^4$ and $R^5$ is methyl and $R^6$ is hydrogen, methyl or ethyl.

5. A compound according to claim 4 wherein $n$ is 3.

6. A compound according to claim 2 wherein each of $R^1$, $R^2$, $R^3$ and $R^5$ is methyl; $R^4$ is ethyl; and $R^6$ is hydrogen, methyl or ethyl.

7. A compound according to claim 6 wherein $n$ is 3.

8. A compound according to claim 2 wherein each of $R^1$, $R^3$ and $R^5$ is methyl; each of $R^2$ and $R^4$ is ethyl; and $R^6$ is hydrogen, methyl or ethyl.

9. A compound according to claim 8 wherein $n$ is 3.

10. A compound selected from those of the following formula:

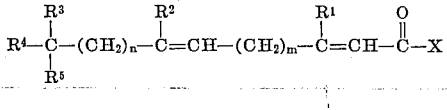

wherein,
  $m$ is an integer of 1 to 4;
  $n$ is an integer of 1 to 4;
  each of $R^1$, $R^2$, $R^3$, $R^4$ and $R^5$ is lower alkyl; and
  X is bromo or chloro.

11. A compound according to claim 10 wherein $m$ is 2; $n$ is 2 or 3; and each of $R^1$, $R^2$, $R^3$, $R^4$ and $R^5$ is methyl or ethyl.

12. A compound according to claim 11 wherein each of $R^1$, $R^2$, $R^3$ and $R^5$ is methyl and $R^4$ is methyl or ethyl.

13. A compound according to claim 12 wherein $n$ is 3.

14. A compound according to claim 11 wherein each of $R^1$, $R^3$ and $R^5$ is methyl and each of $R^2$ and $R^4$ is ethyl.

15. A compound according to claim 14 wherein $n$ is 3.

* * * * *